(12) United States Patent
LaLiberte

(10) Patent No.: US 8,676,506 B1
(45) Date of Patent: Mar. 18, 2014

(54) SYSTEMS AND METHODS FOR IDENTIFYING MISSING SIGNAGE

(75) Inventor: Daniel M. LaLiberte, Acton, MA (US)

(73) Assignee: Google Inc., Mountain View, CA (US)

( * ) Notice: Subject to any disclaimer, the term of this patent is extended or adjusted under 35 U.S.C. 154(b) by 223 days.

(21) Appl. No.: 13/296,607

(22) Filed: Nov. 15, 2011

(51) Int. Cl.
*G01C 23/00* (2006.01)

(52) U.S. Cl.
USPC ........... 701/527; 701/117; 701/201; 701/202; 701/208; 701/209; 701/210; 340/995.2; 348/116; 712/10; 711/119

(58) Field of Classification Search
USPC ................. 701/117, 201, 202, 208, 209, 210; 340/995.2; 348/116; 712/10; 711/119
See application file for complete search history.

(56) References Cited

U.S. PATENT DOCUMENTS

| | | | |
|---|---|---|---|
| 7,873,465 B2 | 1/2011 | Geelen et al. | |
| 8,190,855 B1 * | 5/2012 | Ramey et al. | 712/10 |
| 8,200,901 B1 * | 6/2012 | Wentzlaff et al. | 711/119 |
| 2002/0120397 A1 * | 8/2002 | Kepler | 701/209 |
| 2002/0152024 A1 * | 10/2002 | Stefan | 701/209 |
| 2002/0183922 A1 * | 12/2002 | Tomasi et al. | 701/202 |
| 2003/0112156 A1 * | 6/2003 | Behr et al. | 340/995.2 |
| 2003/0158660 A1 * | 8/2003 | Krull et al. | 701/209 |
| 2003/0229441 A1 * | 12/2003 | Pechatnikov et al. | 701/201 |
| 2005/0065711 A1 * | 3/2005 | Dahlgren et al. | 701/117 |
| 2005/0149259 A1 | 7/2005 | Cherveny et al. | |
| 2008/0046172 A1 * | 2/2008 | Ames et al. | 701/208 |
| 2008/0059055 A1 | 3/2008 | Geelen et al. | |
| 2008/0319658 A1 * | 12/2008 | Horvitz et al. | 701/210 |
| 2011/0199479 A1 * | 8/2011 | Waldman | 348/116 |
| 2011/0238735 A1 | 9/2011 | Gharpure et al. | |

* cited by examiner

*Primary Examiner* — Muhammad Shafi
*Assistant Examiner* — Sanjeev Malhotra
(74) *Attorney, Agent, or Firm* — Dority & Manning, P.A.

(57) ABSTRACT

Methods and systems for identifying missing signage are described herein. The method includes generating a route from an origin to a destination, the route having a plurality of maneuvers. The method further includes receiving missing signage information from a first device, the missing signage information relating to one or more maneuvers of the plurality of maneuvers, and providing the missing signage information and at least one of the one or more related maneuvers to a second device.

24 Claims, 6 Drawing Sheets

SYSTEMS AND METHODS FOR IDENTIFYING MISSING SIGNAGE

FIELD

The present disclosure relates to systems and methods for identifying missing signage.

BACKGROUND

Maps frequently include incorrect information. Map based routing systems, which provide directions as a sequence of maneuvers to follow a route from an origin to a destination, have increased the noticeability of incorrect information in maps. As a result, most map providers attempt to revise incorrect map information and, recently, some map providers have even permitted end users to make suggestions for map corrections.

While inaccuracies in maps have been addressed, missing signage along a route is still a problem. Errors in following a route due to missing signage can lead to very frustrating experiences for users. Maps seldom, if ever, identify signage in the diagrammatic representations shown therein. It is assumed that the proper governmental or private entity responsible for the features shown on the map will also provide and maintain signage to identify such features. Often, however, signage may not be present to identify one or more maneuvers of the route to a user. A user following directions provided by a routing system may get lost, not because of incorrect map information, but because one or more of the sequence of maneuvers that the user is to follow are not indicated by signage.

SUMMARY

Aspects and advantages of the invention will be set forth in part in the following description, or may be obvious from the description, or may be learned through practice of the invention.

A need exists for the ability to identify missing signage along a route. A system and method that can also communicate such information to other users would be particularly beneficial.

One exemplary implementation of the present disclosure is directed to a method for identifying missing signage. The method is executed by a computer system and includes generating a route from an origin to a destination, the route having a plurality of maneuvers. The method further includes receiving missing signage information from a first device, the missing signage information relating to one or more maneuvers of the plurality of maneuvers, and providing the missing signage information and at least one of the one or more related maneuvers to a second device.

Other exemplary implementations of the present disclosure are directed to systems, apparatus, computer-readable mediums, devices, and user interfaces for identifying missing signage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
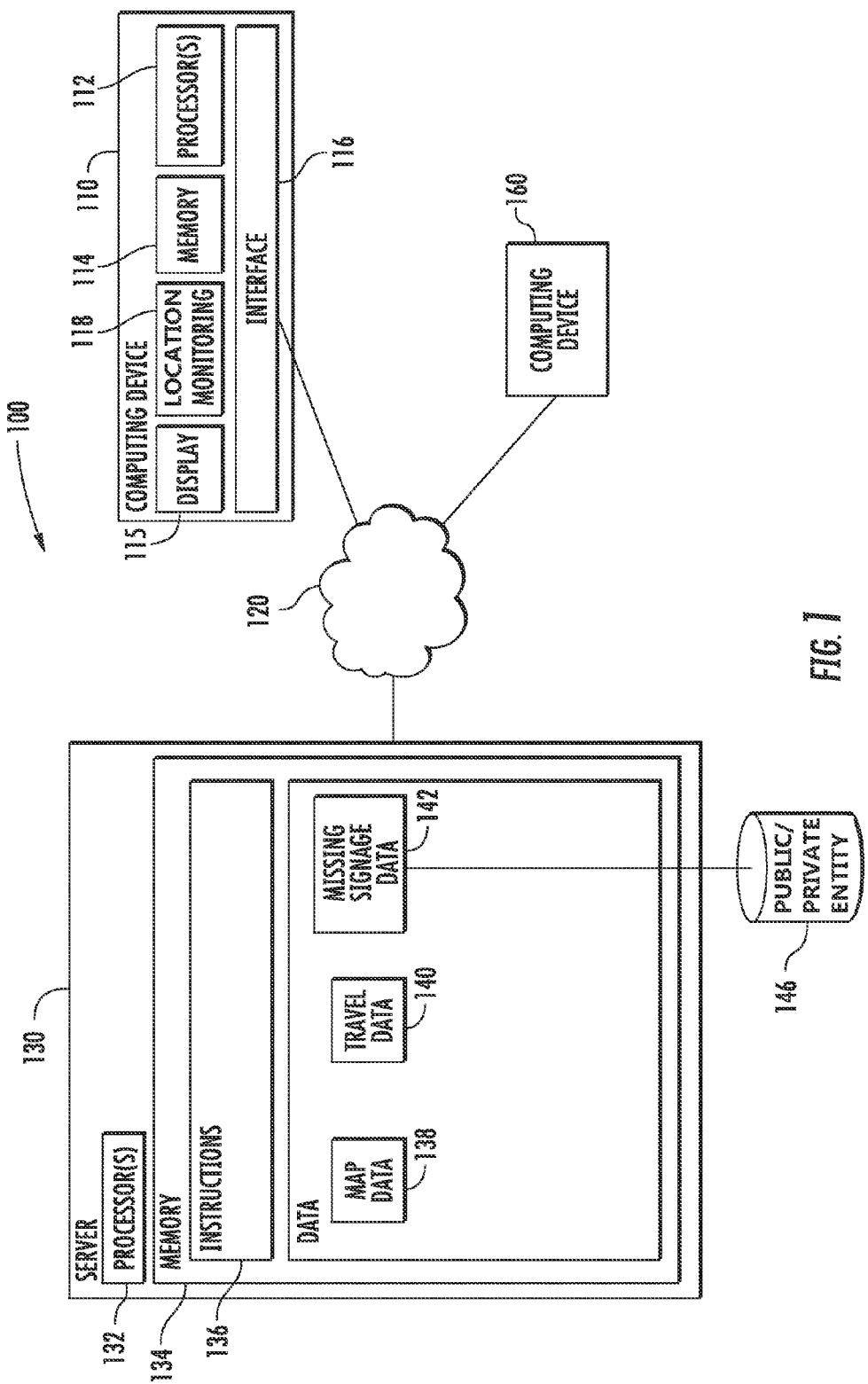
FIG. 1 depicts a block diagram of an exemplary system for identifying missing signage information according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to systems and methods for identification of missing signage in routing for travel, such as by automobile, mass transit, pedestrian, or other modes of travel. Current routing systems do not provide a mechanism for users to report missing signage encountered when following a route. For instance, a user following a route may miss a turn if the street onto which the user is to turn is not marked by signage.

The systems and methods of the present disclosure allow a user to identify missing signage so subsequent users can be made aware of such missing signage. Importantly, the present disclosure is directed to identification of missing signage rather than identification of missing and/or incorrect information about the features that such signage represents. In this manner, the systems and methods of the present disclosure are not focused on correcting mapping information but, rather, are directed to making users aware of missing signage information for a route that may be completely accurate.

In this regard, the term "signage" refers to any commercial or public display sign. Such signs are typically in the form of wayfinding information for a variety of features that may or may not be present on a map including, but not limited to, addresses, streets, businesses, buildings, points of interest, landmarks, historic sites, bodies of water, mountains, forests, cities, states, countries, or the like. As used herein, "missing signage" refers to signage that can be missing or unreadable for a variety of reasons such as theft, damage, temporary removal during replacement, obstructions, misplacement, misleading intent, or simply because signage was never provided for a given location. In accordance with the present disclosure, a user can identify missing signage that relates to one or more maneuvers of a provided route, and the missing signage information can then be shared with other users that are provided the one or more maneuvers as part of the same route or an entirely different route.

For instance, in a particular implementation, the identification of missing signage can include an alleged location of the missing signage and/or one or more images of the alleged location of the missing signage. In this manner, a subsequent user encountering one or more maneuvers previously associated with missing signage can be provided information about the missing signage and have a greater likelihood of successfully following a route.

FIG. 1 illustrates an exemplary system 100 for identifying missing signage according to an exemplary embodiment of the present disclosure. As illustrated, system 100 includes a computing device 110 for receiving information about missing signage from a user as will be described in more detail herein. The computing device 110 device can take any appropriate form, such as a personal computer, smartphone, desktop, laptop, PDA, tablet, or other computing device. The computing device 110 includes appropriate input and output devices, such as a display screen, touch screen, touch pad, data entry keys, camera, speakers, and/or a microphone suitable for voice recognition. A user can request travel directions by inputting origin and destination information into computing device 110. The computing device 110 can receive routing information based on the origin and destination information and provide routing information to the user through any suitable output device, such as a display screen 115. The user is then able to input missing signage information associated with such routing information. In certain aspects of the present disclosure, the computing device 110 can independently calculate routing information based on the origin and destination information and provide the routing information to the user.

The computing device 110 includes a processor(s) 112 and a memory 114. The processor(s) 112 can be any known processing device. Memory 114 can include any suitable computer-readable medium or media, including, but not limited to, RAM, ROM, hard drives, flash drives, or other memory devices. Memory 114 stores information accessible by processor(s) 112, including instructions that can be executed by processor(s) 112. The instructions can be any set of instructions that when executed by the processor(s) 112, cause the processor(s) 112 to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory 114 can also include data that may be retrieved, manipulated, or stored by processor(s) 114. For instance, memory 114 can store information associated with missing signage received from the user of the computing device. As will be discussed in further detail below, such information can be provided to users of other computing devices.

The computing device 110 can include a network interface 116 for accessing information over a network 120. The network 120 can include a combination of networks, such as cellular network, Wi-Fi network, LAN, WAN, the Internet, and/or other suitable network and can include any number of wired or wireless communication links. For instance, computing device 110 could communicate through a cellular network using a WAP standard or other appropriate communication protocol. The cellular network could in turn communicate with the Internet, either directly or through another network.

Computing device 110 can also have a location monitoring component 118 for generating location information for the computing device 110. For instance, the computing device 110 can include a GPS module or can include a component for determining the position of the computing device 110 based on signals received from one or more cell phone towers or from coarse Wi-Fi location. The computing device 110 can communicate location information over network 120 or utilize such information independently for use in providing routing information to the user.

Computing device 110 can communicate with another computing device 130 over network 120. Computing device 130 can be a server, such as a web server, that provides information to a plurality of client computing devices, such as computing devices 110 and 160 over network 120. Computing device 130 receives requests from computing device 110 and locates information to return to computing devices 110 responsive to the request. Further, computing device 110 can send missing signage information to computing device 130 as will be described in more detail herein. The computing device 130 can take any applicable form, and can, for instance, include a system that provides map hosting services, such as the services provided by Google Inc.'s Google Maps system. However, in certain aspects of the present disclosure, computing device 110 can also compute routing information independently from computing device 130.

Similar to computing device 110, computing device 130 includes a processor(s) 132 and a memory 134. Memory 134 can include instructions 136 for receiving routing request information from a client device and for generating a route for presentation to the client device based on the routing request information. Memory 134 can also include or be coupled to various databases containing information for presentation to a user and for generating route information. For instance, memory 134 can include a map database 138, travel parameter database 140, and a missing signage information database 142. As will be discussed below, processor(s) 132 can be configured to execute instructions stored in memory 134 to provide route information to a user based at least in part on information stored in map database 138 and/or travel parameter database 140 with missing signage information database 142 utilized to provide missing signage information in association with such route information where applicable. In certain aspects of the present disclosure, memory 114 of computing device 110 can also be associated with one or more of the above described databases independent of computing device 130.

Map database 138 stores map-related information, at least a portion of which can be transmitted to or present in a client device, such as computing device 110. For instance, map database 138 can store map tiles, where each tile is an image of a particular geographic area. Depending on the resolution (e.g. whether the map is zoomed in or out), a single tile may cover an entire state in relatively little detail or just a few streets in high detail.

The map database 138 can also include points of interest. A point of interest can be any item that is interesting to one or more users and that is associated with a geographical location. For instance, a point of interest can include a landmark, stadium, or building. A point of interest can be added to the map database 138 by professional map providers, individual users, or other entities.

The map database 138 can also store street information. In addition to street images in the tiles, the street information can include the location of a street relative to a geographic area or other streets. For instance, map database 138 can store information indicating whether a traveler can access one street directly from another street. Street information can further include street names where available, and potentially other information, such as distance between intersections and speed limits. All or some of the foregoing can be used by processor(s) 132 and/or processor(s) 112 to compute a route between an origin and destination.

The travel parameter database 140 stores various travel parameters that can be used in the determination of a route from one location to another. For instance, travel parameter database 140 can include information associated with estimated trip time while traversing a particular street or path between locations. Travel parameter database 140 can include information associated with average speed over a particular street or traversable path. Travel parameter database 140 can further include traffic information that can be used in the computation of a route. For instance, travel parameter database 140 can include real-time traffic conditions obtained from, for instance, a traffic service. The travel parameter database 140 can include information obtained from public agencies, roadway monitors, traffic cameras, and the like. The information can include real-time information concerning the speed of traffic flow at particular points in a transportation system.

Missing signage information database 142 can include information optionally provided by one or more users of the missing signage identification system 100. For instance, computing device 110 can receive missing signage information from a user and provide such information to computing device 130, such as one or more alleged locations of missing signage and/or one or more images of the alleged locations of the missing signage. The alleged location of the missing signage can be manually entered by a user in connection with one or more maneuvers of a route or can be automatically determined based on the location monitoring component 118 of computing device 110. Further, one or more landmarks relating to the one or more maneuvers associated with the missing signage information can also be received by computing device 110 and provided to computing device 130 for inclusion in missing signage information database 142.

As described previously, computing device 130 can send route information to another computing device 160 with missing signage information database 142 utilized to provide missing signage information in association with such route information where applicable. As with computing device 110, computing device 160 can take any appropriate form, such as a personal computer, smartphone, desktop, laptop, PDA, tablet, or other computing device. For simplicity, only two additional computing devices 110 and 160 are shown in connection with computing device 130. In practice, very large numbers of computing devices can be in communication with computing device 130. Computing device 160 can receive feedback from a user as to the accuracy of the alleged location of the missing signage as provided by computing device 130 by way of computing device 110 and such feedback can be sent to computing device 130 and added to missing signage information database 142. Similarly, computing device 160 and/or computing device 110 can receive updated missing signage information from a user relating to the status of the missing signage information and can send such updated missing signage information to computing device 130 for inclusion in missing signage information database 142.

In certain aspects of the present disclosure, computing device 130 can provide information from missing signage information database 142 to a private or public entity 146, such as a governmental agency, tasked with addressing missing signage. The information can be provided on an ongoing basis or can be provided after sufficient feedback verifies the accuracy of the alleged location of the missing signage.

Within computing device 130, processor(s) 132 can compute a route in response to requests from a user device, such as computing device 110 or computing device 160, and such devices can include the ability to add missing signage information associated with the route (as described herein with reference to computing device 110) or can display missing signage information in association with maneuvers where signage information is missing (as described herein with reference to computing device 110).

Once a route has been determined, computing device 130 can provide such route information to a computing device over network 120, in embodiments where computing device 130 calculates such routes. The route information can be provided to a computing device in any suitable format. For mobile devices, the information can be transmitted as an HTML document or other fully-formatted document that will not require significant processing by the mobile device. The information can include HTML code, XML messages, WAP code, Java applets, xhtml, plain text, voiceXML, VoxML, VXML, or other suitable format, that causes the device to display the suggested route information.

FIGS. 2-5 depict exemplary mobile devices 110, 160 for identifying missing signage information associated with a route (as described herein with reference to computing device 110) and displaying missing signage information in association with maneuvers where signage information is missing (as described herein with reference to computing device 110) according to an exemplary embodiment of the present disclosure. It should be appreciated that the description is merely exemplary and that a variety of other user interfaces are contemplated in connection with the present disclosure.

Figure 2:
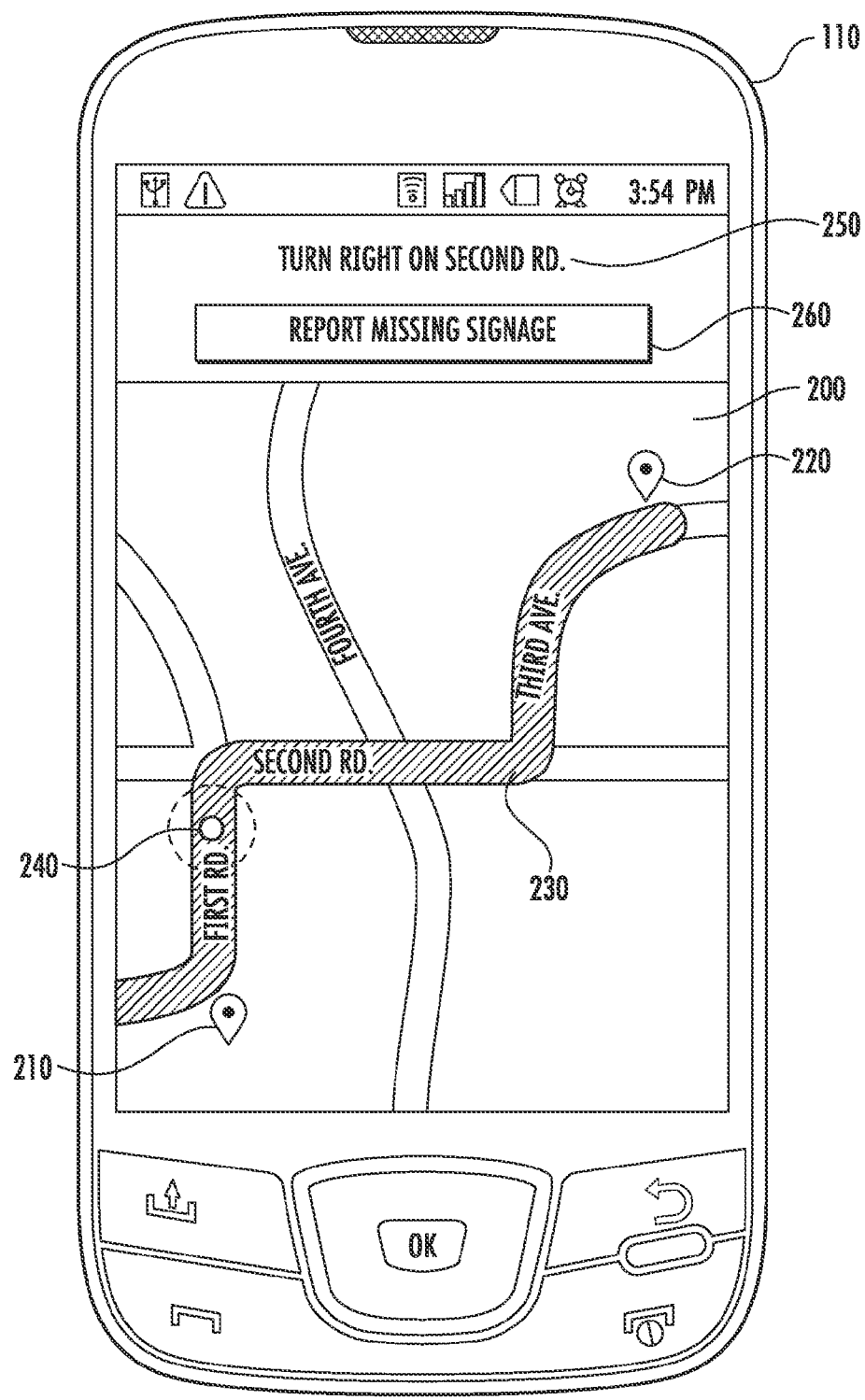
FIGS. 2-5 depict exemplary mobile computing devices displaying missing signage information according to an exemplary embodiment of the present disclosure.

As shown in FIG. 2, exemplary mobile device 110 includes an interface 200 that depicts map information, including a plurality of streets between an origin 210 and a destination 220. A suggested route 230 is highlighted along the plurality of streets. In addition, the interface 200 includes a location indicator 240 that indicates the current location of the mobile device 110 along the suggested travel route 230.

The suggested route information can include information in addition to a simple map with routes rendered on it. For instance, text directions associated with the suggested route are provided to the user as the maneuvers that form the route are encountered. As shown, maneuver 250 instructs the user to "Turn Right on Second Rd." Locations on the map could be provided with hyper-linked icons whose selection will cause information to be broadcast to the user. Other information could include annotations associated with points of interest along the travel route. The annotations displayed to the user could be selected based on personal preferences optionally shared by the user with the system.

Additionally, the interface 200 includes a reporting interface 260 on the mobile device 110. The reporting interface 260 allows a user to report missing signage by selecting the box labeled "Report Missing Signage." In this regard, the user can select the reporting interface 260 if the user believes that signage is missing for the maneuver 250 associated with the route.

Figure 3:
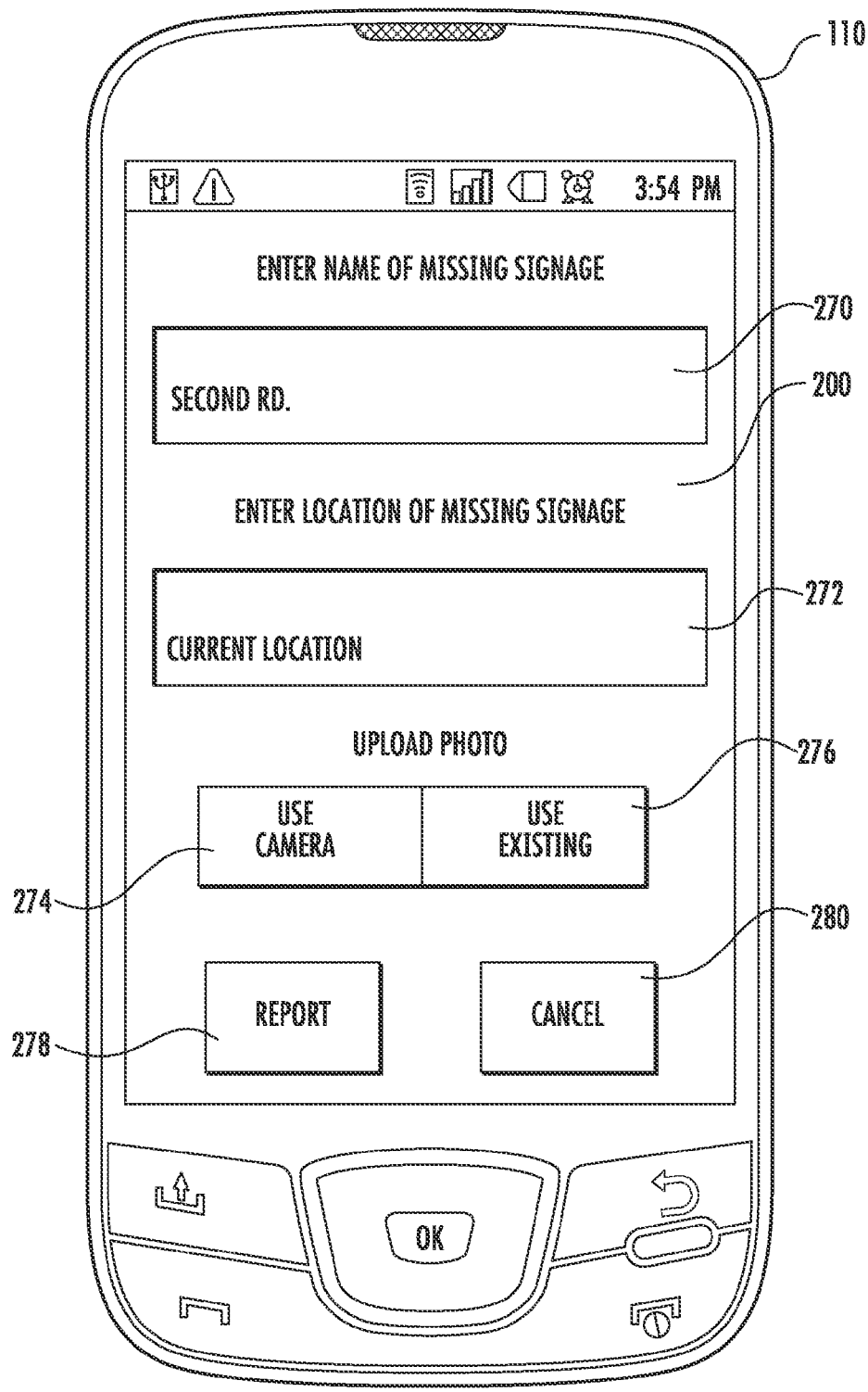

Referring to FIG. 3, when a user selects the box labeled "Report Missing Signage", the interface 200 presents options related to information surrounding the reporting of missing signage. Dialog box 270 allows a user to enter the name of the missing signage, such as the street name, business name, or the like. As shown, in certain aspects of the present disclosure, the system can prepopulate the dialog box 270 with information based on the upcoming maneuver 205. For instance, as shown in FIG. 2 since maneuver 250 instructs the user to "Turn Right on Second Rd", the system can infer that the missing signage relates to "Second Rd." and add this information in dialog box 270, which can be modified by the user as necessary.

Dialog box 272 allows a user to enter the location of where the missing signage is presumed to have been located, such as the longitude and latitude of the location, an intersection near such location, a street address, or the like. Again, in certain aspects of the present disclosure, the system can prepopulate the dialog box 270 with information based on the upcoming maneuver 205 and/or location monitoring component 118. For instance, as shown, the dialog box 270 includes "Current Location" which assumes that the missing signage is located in proximity to the location of the device 210.

The buttons 274, 276 located underneath the "Upload photo" text allow a user to send a photo of the missing signage to the system, such as by utilizing a camera present on device 210 by selecting the "Use camera" button 274 or by utilizing an existing photo either on the device or in communication with device by selecting the "Use existing" button 276.

Once the user has reviewed the information, they can report the missing signage by selecting the "Report" button 278 or can cancel the submission by selecting the "Cancel" button 280.

Figure 4:
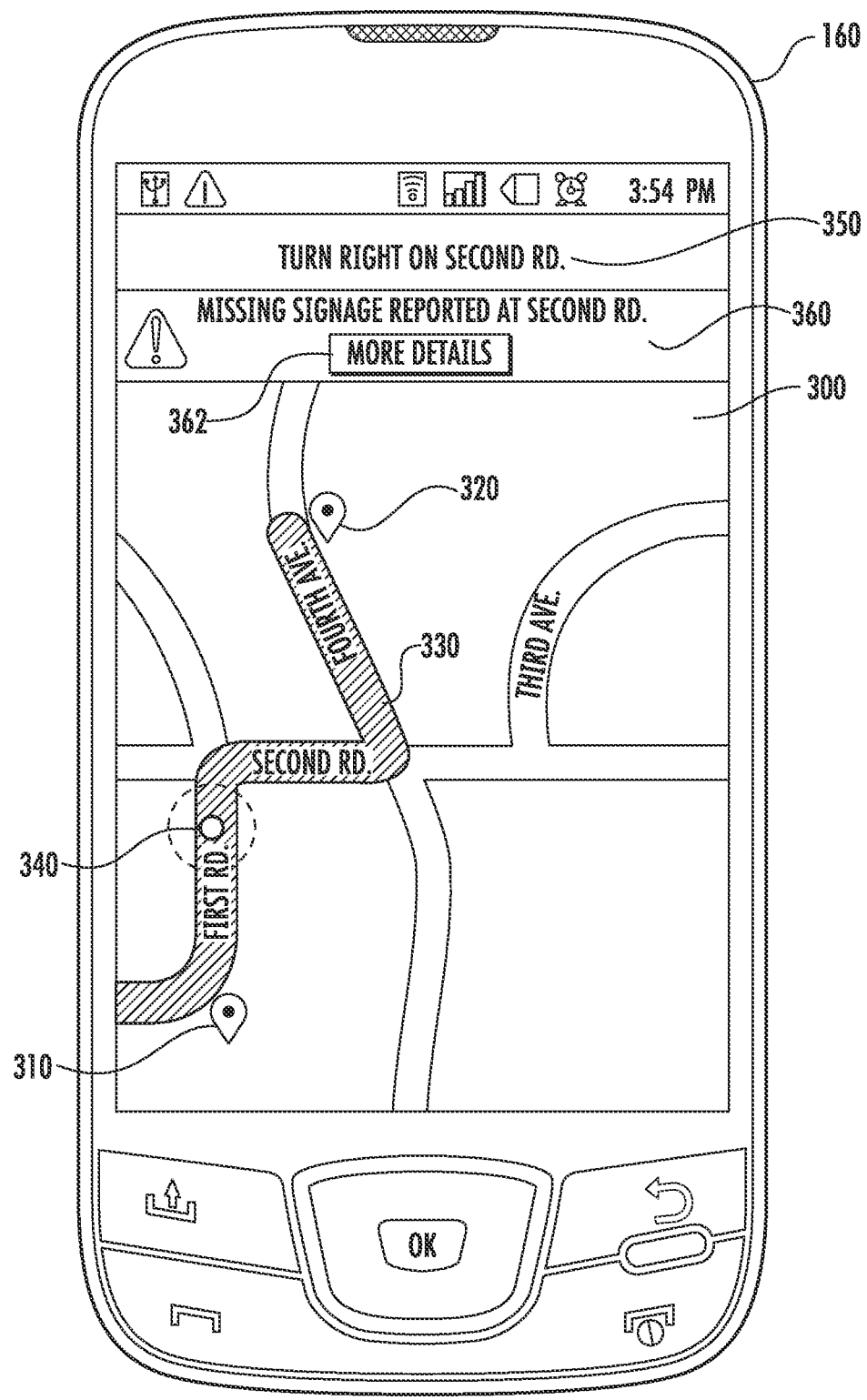

As described above, once missing signage has been reported in association with one or more maneuvers of a route, another device can receive such missing signage information in connection with the identical route or a completely different route that utilizes one or more of the maneuvers associated with the missing signage. Referring to FIG. 4, exemplary mobile device 160 includes an interface 300 that depicts map information, including a plurality of streets between an origin 310 and a destination 320. A suggested route 330 is highlighted along the plurality of streets. In this exemplary embodiment, the suggested route 330 is different from the suggested route 230 but in other aspects of the present disclosure, the routes can be the same. Interface 300 includes a location indicator 340 that indicates the current location of the mobile device 160 along the suggested travel route 330.

As with interface 200, text directions associated with the suggested route are provided to the user as the maneuvers that form the route are encountered. As shown, maneuver 350 instructs the user to "Turn Right on Second Rd."

Interface 300 includes a reporting interface 360 on the mobile device 160. In this exemplary embodiment, mobile device 110 previously reporting missing signage at Second Rd. As a result, reporting interface 360 includes a message "Missing Signage Reported at Second Rd." The reporting interface 360 allows a user to receive more details by selecting the box 362 labeled "More Details."

Figure 5:
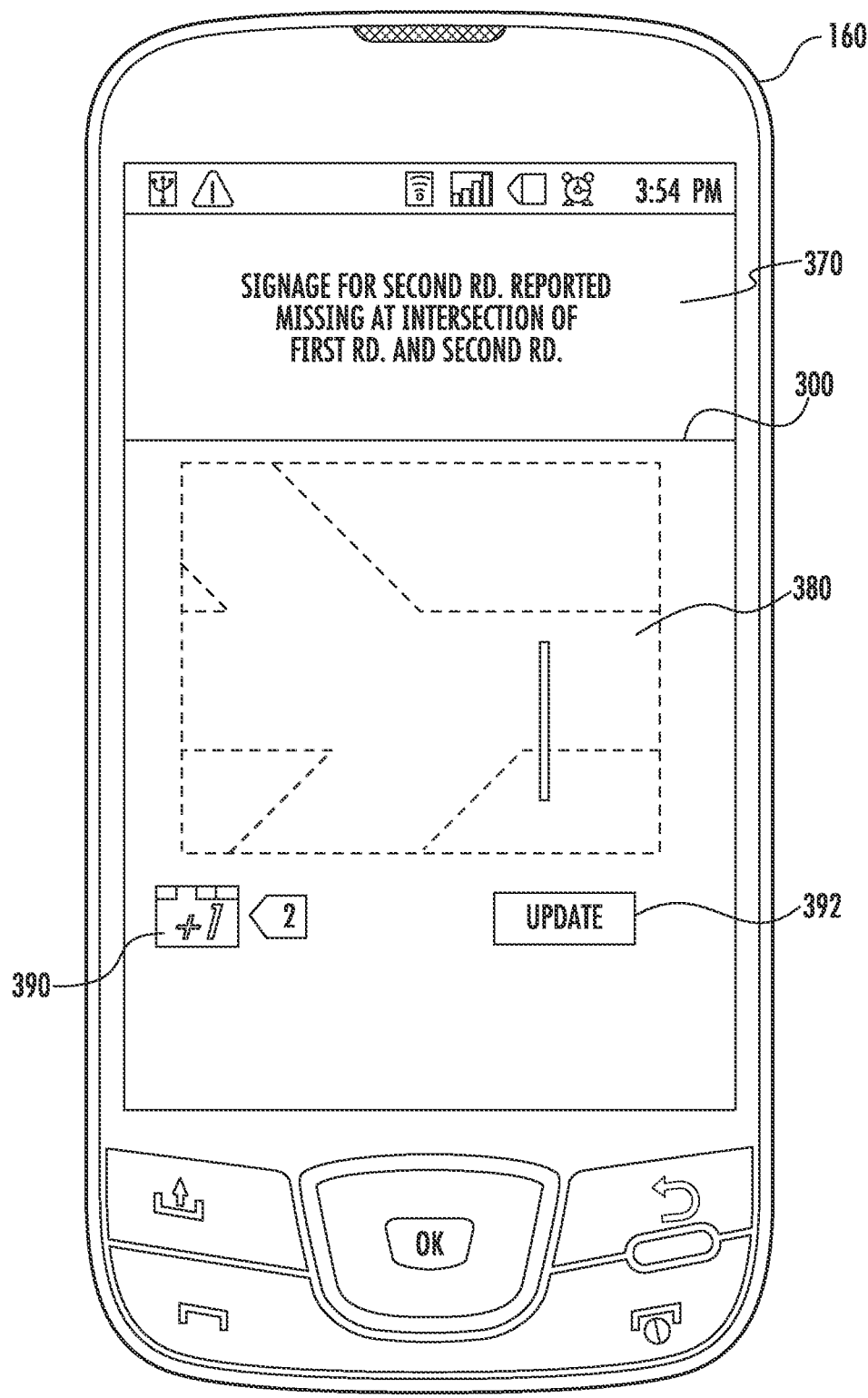

As illustrated in FIG. 5, when a user selects the box labeled "More Details", the interface 300 presents more details about the missing signage alert as well as options related to the reporting of missing signage. For instance, message 370 can display "Signage for Second Rd. reported missing at intersection of First Rd. and Second Rd." with the applicable details of the message populated by the system using the previously input missing signage information from device 110. Similarly, image 380 can be displayed (if such image has been uploaded) showing the presumed location of the missing signage.

Feedback can be recorded about the missing signage utilizing any suitable mechanism. For example, the feedback can be shared via a social networking service and/or provided to a mapping or navigation service. As illustrated, a +1 button 390 can be utilized to recommend the missing signage on Google Inc.'s Google Search and to share such information on Google Inc.'s Google+ or other social networking sites. A user can also select the update button 392 to revise the information as needed, such as to remove the missing signage information if the missing signage has been replaced and/or correct the location or description of the missing signage.

A feature of the present disclosure that makes the crowdsourcing of information more valuable, as well as providing a way to filter out abuse such as spam advertising, is that many users can provide feedback on the value of information provided by other users. In certain aspects of the present disclosure, each of the reports of missing signage is subject to review and comments by other users. In particular aspects of the present disclosure, a list of missing signage reports for a location can be sorted by the number of positive feedbacks that are received, as this would serve to reinforce users who provide reports that are judged more positively. Additional mechanisms to provide feedback, structured and unstructured, that could aid in improving the quality of the missing signage lists, such as indicting "helpful" or "fixed" or "obsolete" are also contemplated in accordance with the present disclosure. For the purpose of displaying missing signage reports and feedback on a mobile device, the highest rated items can be displayed with an option to view more items if desired.

Figure 6:
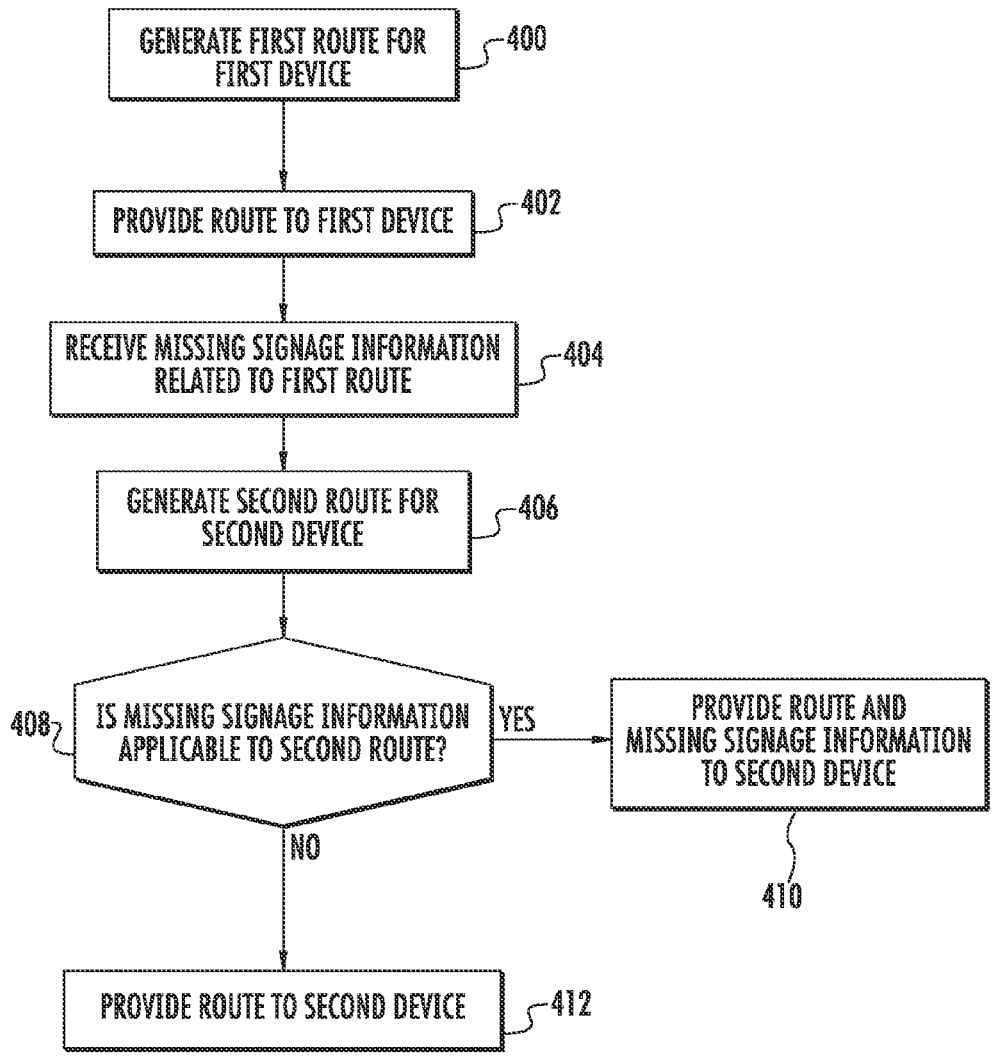
FIG. 6 depicts a flow diagram of an exemplary method according to an exemplary embodiment of the present disclosure.

FIG. 6 is an exemplary flow diagram of a method for identifying missing signage. The method shown in FIG. 6 will be discussed with reference to the missing signage identification system 100 illustrated in FIG. 1. However, those of ordinary skill in the art, using the disclosures provided herein, will appreciate the methods discussed herein can be executed by any computing device or combination of computing devices.

Referring back to FIG. 6, a route is generated from an origin to a destination for a first device (400) in a manner as would be understood by one of ordinary skill in the art. The origin information can be manually entered by a user on computing device 110 or can be based on a user's current location determined by, for instance, the location monitoring component 118. The destination information can be manually entered by the user or can be automatically retrieved based on the information associated with the user, such as the user's calendar information. For instance, the destination information can be based on an intended location for a meeting scheduled in a user's calendar. The route includes a sequence of maneuvers to follow the route from the origin to the destination. The route can be generated by using information from the map database 138 and travel parameter database 140 and the system of the present disclosure can calculate the sequence of maneuvers according to conventional criteria such as fastest route, shortest route, avoidance of roads, and the like, as would be understood by one of ordinary skill in the art.

Once the route has been generated, the route is provided to the first device that requested the route (402). The first device allows a user to input information about missing signage related to the route (404). Such information can be sent to missing signage database 142.

A second route is then generated from an origin to a destination for a second device (406), such as computing device 160, in a manner as described above. The system 100 determines if the missing signage information previously input (404) is applicable to the second route generated for the second device (408).

If the missing signage information is applicable to the second route, then the second route and the missing signage information associated therewith are provided to the second device (410). If the missing signage information is not applicable to the second route, then the second route is provided to the second device without the missing signage information (412).

In this regard, the system of the present disclosure can provide a mechanism for users to report missing signage encountered when following a route. In addition, subsequent users can be provided with the missing signage information if the route they are to travel is associated with such missing signage. In this manner, much of the frustration from encountering missing signage along a route can be mitigated.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for identifying missing signage, the method executed by a computer system and comprising:
    generating a route from an origin to a destination, the route comprising a plurality of maneuvers;
    receiving missing signage information from a first device, a least some portion of the missing signage information being manually input into the first device by a user of the first device, the missing signage information comprising an alleged location of missing signage and relating to one or more maneuvers of the plurality of maneuvers; and
    providing the missing signage information and at least one of the one or more related maneuvers to a second device such that the missing signage information is displayed to a user of the second device in association with at least one of the one or more related maneuvers.

2. The method of claim 1, wherein the missing signage information further comprises one or more images of the alleged location of the missing signage.

3. The method of claim 1, wherein the first device comprises a mobile device having a wireless location system, the wireless location system generating the alleged location of the missing signage.

4. The method of claim 3, wherein the wireless location system comprises a global positioning system.

5. The method of claim 3, wherein the wireless location system comprises cell phone tower triangulation.

6. The method of claim 3, wherein the wireless location system comprises coarse wi-fi location.

7. The method of claim 1, further comprising:
    receiving one or more landmarks from the first device relating to the one or more maneuvers of the plurality of maneuvers; and
    providing the one or more landmarks to the second device.

8. The method of claim 1, further comprising receiving feedback from a user of the second device as to the accuracy of the alleged location of missing signage received from the first device.

9. The method of claim 1, further comprising providing the missing signage information to a governmental agency tasked with addressing missing signage.

10. The method of claim 1, further comprising receiving updated missing signage information from at least one of the first device or second device, the updated missing signage information relating to the status of the missing signage.

11. A system comprising one or more processing devices and a network interface, the one or more processing devices configured to:
    identify a sequence of maneuvers, the sequence of maneuvers comprising instructions defining a route from an origin to a destination;
    receive, via the network interface, missing signage information from a first device, the first device being configured to receive from a user of the first device manual input corresponding to at least some portion of the missing signage information, the missing signage information comprising an alleged location of missing signage and relating to one or more maneuvers of the sequence of maneuvers; and
    provide, via the network interface, the missing signage information and at least one of the one or more related maneuvers to a second device such that the missing signage information is displayed to a user of the second association with at least one of the one or more related maneuvers.

12. The system of claim 11, wherein the processing device is further configured to:
    receive, via the network interface, one or more landmarks from the first device relating to the one or more maneuvers of the plurality of maneuvers; and
    provide, via the network interface, the one or more landmarks to the second device.

13. The system of claim 11, wherein the processing device is further configured to receive, via the network interface, feedback from a user of the second device as to the accuracy of the alleged location of missing signage received from the first device.

14. The system of claim 11, wherein the processing device is further configured to provide, via the network interface, the missing signage information to a governmental agency tasked with addressing missing signage.

15. The system of claim 11, wherein the processing device is further configured to receive, via the network interface, updated missing signage information from at least one of the first device or second device, the updated missing signage information relating to the status of the missing signage.

16. A system for reporting missing signage comprising:
    a display device;
    an input device;
    one or more processors; and
    at least one memory coupled to the one or more processors, the at least one memory comprising computer-readable instructions for execution by the one or more processors to cause the one or more processors to perform operations, comprising:
        presenting a user interface on the display device, the user interface including route from an origin to a destination, the route comprising a plurality of maneuvers;
        presenting a reporting interface with the plurality of maneuvers, the reporting interface configured to receive missing signage information comprising an alleged location of missing signage and associated with one or more of the plurality of maneuvers of the route upon user interaction with the reporting interface;
        receiving a manual user input of at least some portion of the missing signage information through the input device directed to the reporting interface; and
        sending the missing signage information and at least one of the plurality of maneuvers to a second device such that the missing signage information is presented to a user of the second device in association with at least one of the plurality of maneuvers.

17. The system of claim 16, wherein the missing signage information further comprises one or more images of the alleged location of the missing signage.

18. The system of claim 16, wherein the operations comprise:
presenting a user interface comprising a map that depicts the route.

19. The system of claim 18, wherein the operations comprise:
presenting the reporting interface overlying at least a portion of the route on the map.

20. The system of claim 16, wherein the reporting interface is further configured to receive user feedback as to the accuracy of the alleged location of missing signage upon user interaction with the reporting interface.

21. The system of claim 16, wherein the reporting interface is further configured to receive updated missing signage information relating to the status of the missing signage upon user interaction with the reporting interface.

22. The system of claim 16, wherein the reporting interface is further configured to receive one or more landmarks relating to the one or more maneuvers of the plurality of maneuvers upon user interaction with the reporting interface.

23. The system of claim 19, wherein the reporting interface is configured to allow a user to select a portion of the route on the map associated with the missing signage information upon user interaction with the reporting interface.

24. The system of claim 19, wherein the reporting interface is configured to allow a user to select landmarks on the map relating to the one or more maneuvers of the plurality of maneuvers upon user interaction with the reporting interface.

* * * * *

UNITED STATES PATENT AND TRADEMARK OFFICE
CERTIFICATE OF CORRECTION

PATENT NO. : 8,676,506 B1
APPLICATION NO. : 13/296607
DATED : November 15, 2011
INVENTOR(S) : LaLiberte Page 1 of 1

It is certified that error appears in the above-identified patent and that said Letters Patent is hereby corrected as shown below:

In the Claims

Claim 1, Column 9, line 25, after "device," delete the word "a" and insert the word --at--

Claim 11, Column 10, lines 16-17, between the words "second" and "association", insert the words --device in--

Signed and Sealed this
Eighteenth Day of November, 2014

Michelle K. Lee
*Deputy Director of the United States Patent and Trademark Office*